(12) United States Patent
Dragone et al.

(10) Patent No.: US 10,388,127 B2
(45) Date of Patent: *Aug. 20, 2019

(54) ELECTRONIC DEVICES WITH INDIVIDUAL SECURITY CIRCUITS

(71) Applicant: INTERNATIONAL BUSINESS MACHINES CORPORATION, Armonk, NY (US)

(72) Inventors: Silvio Dragone, Winterthur (CH); Christoph Hagleitner, Wallisellen (CH); Stefano S. Oggioni, Besana in Brianza (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/922,114

(22) Filed: Mar. 15, 2018

(65) Prior Publication Data

US 2018/0204430 A1 Jul. 19, 2018

Related U.S. Application Data

(63) Continuation of application No. 15/357,078, filed on Nov. 21, 2016, now Pat. No. 10,008,081.

(30) Foreign Application Priority Data

Jul. 11, 2016 (IT) .................. 102016000072154

(51) Int. Cl.
*G06F 21/52* (2013.01)
*G06F 21/86* (2013.01)
*G08B 13/12* (2006.01)

(52) U.S. Cl.
CPC ........... *G08B 13/128* (2013.01); *G06F 21/52* (2013.01); *G06F 21/86* (2013.01)

(58) Field of Classification Search
CPC ........ G06F 21/14; G06F 21/52; G06F 21/558; G06F 21/57; G06F 21/602; G06F 21/70;
(Continued)

(56) References Cited

U.S. PATENT DOCUMENTS 4,939,792 A 7/1990 Urbish et al.
5,224,430 A 7/1993 MacPherson
(Continued)

OTHER PUBLICATIONS

Dragone et al., "List of IBM Patents or Patent Applications Treated as Related", U.S. Appl. No. 15/922,114, filed Mar. 15, 2018 (2 pages).

*Primary Examiner* — Quan-Zhen Wang
*Assistant Examiner* — Stephen R Burgdorf
(74) *Attorney, Agent, or Firm* — Tihon Poltavets, Esq.; Kevin P. Radigan, Esq.; Heslin Rothenberg Farley & Mesiti P.C.

(57) ABSTRACT

Manufacturing a batch is provided which includes a plurality of items of an electronic device, the items including a plurality of corresponding main modules having a same functional structure substantially identical for the items. The method includes defining at least one security electric circuit, of an enclosure component for enclosing each item, adapted to protect the item from tampering, the security electric circuits having individual configurations substantially different among the items, for use in forming the security electric circuit with the corresponding configuration on each enclosure component. Additionally, the method includes determining one or more electric characteristics of each security electric circuit for use in configuring a monitoring circuit of the corresponding main module, the monitoring circuit being adapted to the corresponding security electric circuit for detecting the tampering, according to the electric characteristics of the corresponding security circuits.

20 Claims, 9 Drawing Sheets

(58) Field of Classification Search
CPC .......... G06F 21/72; G06F 21/86; G06F 21/87;
G06F 2221/2143; G06Q 10/08; G08B
13/128; G08B 29/046; H01L 23/576;
H04L 9/003; H04L 9/14; H04L 63/0428;
H04L 63/0823; H04L 2209/12; H05K
1/02775; H05K 5/0208; H05K 2201/0999
USPC .................................. 340/541, 652; 713/194
See application file for complete search history.

(56) References Cited

U.S. PATENT DOCUMENTS

| | | |
|---|---|---|
| 5,999,097 A | 12/1999 | Liddle et al. |
| 7,703,201 B2 | 4/2010 | Oggioni et al. |
| 7,915,540 B2 | 3/2011 | Oggioni |
| 8,211,538 B2 | 6/2012 | Heffner, II |
| 8,613,111 B2 | 12/2013 | Condorelli et al. |
| 9,363,794 B1 | 6/2016 | Oon et al. |
| 2003/0009683 A1 | 1/2003 | Schwenck et al. |
| 2006/0087883 A1 | 4/2006 | Ozguz et al. |
| 2006/0271792 A1 | 11/2006 | Srinivas et al. |
| 2008/0036598 A1 | 2/2008 | Oggioni |
| 2012/0278905 A1 | 11/2012 | Condorelli et al. |
| 2013/0011215 A1 | 1/2013 | Wells et al. |
| 2014/0056491 A1 | 2/2014 | Knight |
| 2014/0297540 A1 | 10/2014 | Swamy et al. |
| 2015/0097572 A1 | 4/2015 | Wade et al. |
| 2015/0332135 A1 | 11/2015 | Dixit et al. |
| 2018/0012459 A1 | 1/2018 | Dragone et al. |

ELECTRONIC DEVICES WITH INDIVIDUAL SECURITY CIRCUITS

BACKGROUND

The present disclosure relates to the field of electronics. More specifically, this disclosure relates to electronic devices.

Electronic devices are commonly used in a number of applications. Particularly, electronic devices of tamper-resistant type are used to protect them from unauthorized physical intrusions (for example, intended to inspect, alter or disrupt them); a typical example is a crypto-processor dedicated to perform cryptographic operations on board (such as for use in smartcards).

For example, the (tamper-resistant) electronic devices may be designed to prevent (or at least to make it very difficult) the reading of secrets (i.e., sensitive information such as cryptographic keys) stored in the electronic devices from the outside. For this purpose, the electronic devices are provided with security features for detecting any attempts to penetrate them (for example, with microprobes); as soon as any penetration attempt is detected, the electronic devices immediately reset (erase) their sensitive information so as to prevent any unauthorized reading thereof.

Generally, each electronic device includes one or more electronic components to be protected (for example, a microprocessor integrated on a chip), which are encapsulated in an enclosure; the above-mentioned security features may then be based on a security (electric) circuit (or more) that is formed on the enclosure (around the electronic components). The security circuit is very thin, so as to make it very hard (if not impossible) to detect by x-ray inspection. Moreover, the security circuit is arranged in a mesh with a very low pitch, so as to define a sort of (unknown) fence that encloses the electronic components (for example, when arranged along different directions, typically orthogonally, in several overlapping layers). Therefore, by monitoring one or more electric characteristics of the security circuit (for example, its resistance), it is possible to detect any penetration attempt in response to their variation (which may result from a short circuit caused by a conductive probe that reaches two points of the security circuit or from an open circuit caused by an insulating probe that cuts the security circuit).

However, the security circuit may be shunted so as to insulate a portion thereof that is not monitored any longer and then may be used for penetrating the electronic device. Therefore, the security circuit is generally designed in such a way that is difficult to contact it (for example, because it is very fragile and not solderable). In any case, even though these expedients may hinder the probing of the security circuit, they are not able to avoid it at all.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In one or more implementations, a method is provided for manufacturing a batch of a plurality of items of an electronic device, where each item includes an enclosure component mounted to a respective carrier. The items include a plurality of corresponding main modules having a same functional structure substantially identical for the items. The method includes defining, for each of a plurality of enclosure components, at least one security electric circuit on an inner wall surface of the enclosure component. The enclosure component is to mount to the respective carrier and enclose, at least in part, a respective main module. The at least one security electric circuit is adapted to protect the respective item from tampering, and the security electric circuits defined for the plurality of enclosure components have individual configurations substantially different among the plurality of enclosing components for the items. Further, the method includes determining one or more electric characteristics of each security electric circuit, and using the determined one or more electric characteristics of each security electric circuit in configuring a monitoring circuit of the corresponding main module of the respective item. The monitoring circuit is adapted to monitor the corresponding security electric circuit for detecting the tampering, according to the determined electric characteristics of the corresponding at least one security electric circuit. The defining at least one security electric circuit includes: storing an indication of a pool of candidate security electric circuits for the batch; selecting the security electric circuit of each enclosure component among the pool of candidate security electric circuits in a substantial random way; developing for each enclosure component a functional area of the enclosure component corresponding to the security electric circuit into a planar surface; defining the security electric circuit for the planar surface; and projecting the security electric circuit from the planar surface onto the functional area of the enclosure component.

In another aspect, a computer program product is provided which includes a computer-readable storage medium having program instructions embodied therewith. The program instructions are executable by a computing system to cause the computing system to perform a method for manufacturing a batch of a plurality of items of an electronic device. Each item includes an enclosure component mounted to a respective carrier, and the items include a plurality of corresponding main modules having a same functional structure substantially identical for the items. The method includes defining, for each of a plurality of enclosure components, at least one security electric circuit to be formed on an inner wall surface of the enclosure component. The enclosure component is to mount to the respective carrier and enclose, at least in part, a respective main module. The at least one security electric circuit is adapted to protect the respective item from tampering, and the security electric circuits defined for the plurality of enclosure components have individual configurations substantially different among the plurality of enclosing components for the items. The method further includes determining one or more electric characteristics of each security electric circuit, and using the determined one or more electric characteristics of each security electric circuit in configuring a monitoring circuit of the corresponding main module of the respective item. The monitoring circuit is adapted to monitor the corresponding security electric circuit for detecting the tampering, according to the determined electric characteristics of the corresponding at least one security electric circuit. The defining at least one security electric circuit includes: storing an indication of a pool of candidate security electric circuits for the batch; selecting the security electric circuit of each enclosure component among the pool of candidate security electric circuits in a substantial random way; developing for each enclosure component a functional area of the enclosure component corresponding to the security electric circuit into a planar surface; defining the security electric circuit for the planar surface; and projecting the security electric circuit from the planar surface onto the functional area of the enclosure component.

In another aspect, a system for manufacturing a batch of a plurality of items of an electronic device is provided. Each item includes an electronic enclosure mounted to a respective carrier. The items include a plurality of corresponding main modules having a same functional structure substantially identical for all the items. The system includes a memory, and a processor communicatively coupled to the memory. The system performs a method which includes defining, for each of a plurality of enclosure components, at least one security electric circuit to be formed on an inner wall surface of the enclosure component. The enclosure component is to mount to the respective carrier and enclose, at least in part, a respective main module. The at least one security electric circuit is adapted to protect the respective item from tampering, and the security electric circuits defined for the plurality of enclosure components have individual configurations substantially different among the plurality of enclosing components for the items. The method further includes determining one or more electric characteristics of each security electric circuit, and using the determined one or more electric characteristics of each security electric circuit in configuring a monitoring circuit of the corresponding main module of the respective item. The monitoring circuit is adapted to monitor the corresponding security electric circuit for detecting the tampering, according to the determined electric characteristics of the corresponding at least one security electric circuit. The defining at least one security electric circuit includes: storing an indication of a pool of candidate security electric circuits for the batch; selecting the security electric circuit of each enclosure component among the pool of candidate security electric circuits in a substantial random way; developing for each enclosure component a functional area of the enclosure component corresponding to the security electric circuit into a planar surface; defining the security electric circuit for the planar surface; and projecting the security electric circuit from the planar surface onto the functional area of the enclosure component.

Additional features and advantages are realized through the techniques of the present invention. Other embodiments and aspects of the invention are described in detail herein and are considered a part of the claimed invention.

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). In this respect, it is expressly intended that the figures are not necessary drawn to scale (with some details that may be exaggerated and/or simplified) and that, unless otherwise indicated, they are merely used to illustrate the structures and procedures described herein conceptually. More particularly.

DETAILED DESCRIPTION

The shunting of the security circuit may be facilitated when its pattern is deterministic (for example, because formed by the repetition of a constant basic shape); indeed, in this case a localized analysis of the security circuit might be effective in predicting its whole scheme.

In order to improve the security level of the electronic device, it is possible to create the security circuit with a non-predictable pattern (for example, by direction changes deviating from repetitive and constant arrangements).

Moreover, it is possible to create the security circuit with a pseudo-random pattern. For example, the security circuit may have a pattern that is an approximation of a space-filling curve obtained by the replication of an elementary space element having a base curve inscribed therein.

Advantageously, this makes it more difficult the prediction of the scheme of the security circuit from a localized analysis thereof, since it's far away portions run in completely different directions.

Nevertheless, availability of a sample of the electronic devices for a long period may allow deducing the pattern of its security circuit; which would be facilitated by the availability of several samples of the electronic devices for testing and practice.

In general terms, the present disclosure is based on the idea of providing the electronic devices with individual security circuits.

Particularly, an aspect provides a method for manufacturing a batch including a plurality of items of an electronic device (including a plurality of corresponding main modules having a same functional structure substantially identical for all the items), wherein at least one security electric circuit of an enclosure component for enclosing each item is determined (with the security electric circuits having individual configurations substantially different among the items) and one or more electric characteristics of the security electric circuit are determined for configuring a monitoring circuit of the corresponding main module accordingly.

A further aspect provides a computer program for performing the method.

A further aspect provides a computer program product for performing the method.

A further aspect provides a system for implementing the method.

A further aspect provides a corresponding batch of items of an electronic device.

Figure 1:
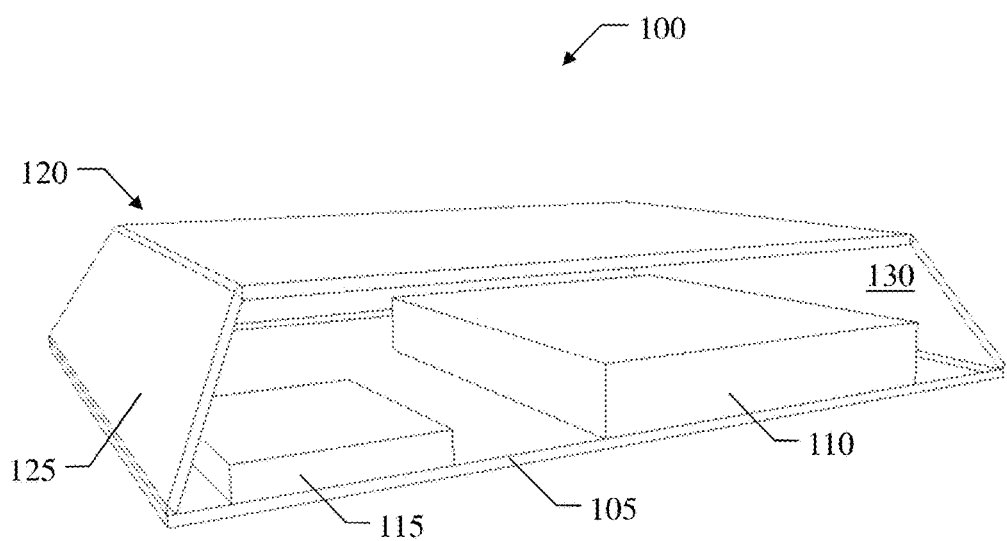
FIG. 1 depicts a cross-sectional view of one embodiment of an electronic device, wherein a solution according to one or more aspects of the present invention may be applied.

With reference in particular to FIG. 1, a pictorial representation in cross-sectional view is shown of an electronic device 100, wherein one or more aspects of the present disclosure may be applied.

By way of example, the electronic device 100 is of tamper-resistant type (i.e., provided with security features aimed at reducing the risk of tampering thereof). The electronic device 100 includes a (chip) carrier 105, formed by an (electrically) insulating substrate (for example, of epoxy resin) supporting an electric circuit (for example, of copper). A (monolithic) chip 110 of semiconductor material (for example, silicon) and a battery 115 are mounted on the carrier 105; for example, the chip 110 integrates a cryptoprocessor storing cryptographic keys in a memory thereof. Input/output terminals of the chip 110 are coupled (for example, by wire-bonding) with the electric circuit of the carrier 105, which in turn is coupled with corresponding contacts of the electronic device (for example, arranged on an opposite surface of the carrier 105 and then not visible in the figure) for exchanging signals with the outside; supply terminals of the chip 110 are instead coupled (for example, again by wire-bonding) with corresponding terminals of the battery 115 for receiving a power supply voltage.

A (protective) cap 120 is bonded (for example, soldered) on the carrier 105, around the chip 110 and the battery 115. The cap 120 includes an (electrical) insulating substrate 125 (for example, of thermoplastic resin doped with a metal-plastic additive) that supports a security (electric) circuit 130, or more, formed on an internal surface thereof (for detecting any attempts to penetrate the electronic device 100). The security circuit 130 is very thin (for example, with a thickness of 50-500 nm) to hinder its detection by x-ray inspection; moreover, the security circuit 130 is made of a material (for example, NiP or NiCr) that is highly resistive to reduce power consumption, difficult to solder and (in combination with its thinness) very fragile to hinder its probing. A monitoring circuit integrated on the chip 110 is (electrically) coupled with the security circuit 130 (for example, again by wire-bonding) for monitoring one or more electrical characteristics thereof (for example, by measuring its resistance with a Wheatstone bridge); should the monitoring circuit of the chip 110 detect any variation of the electrical characteristics of the security circuit 130 (for example, reaching a threshold indicative of a possible penetration attempt), it immediately resets its memory (so as to prevent any unauthorized reading of the cryptographic keys).

Figure 2:
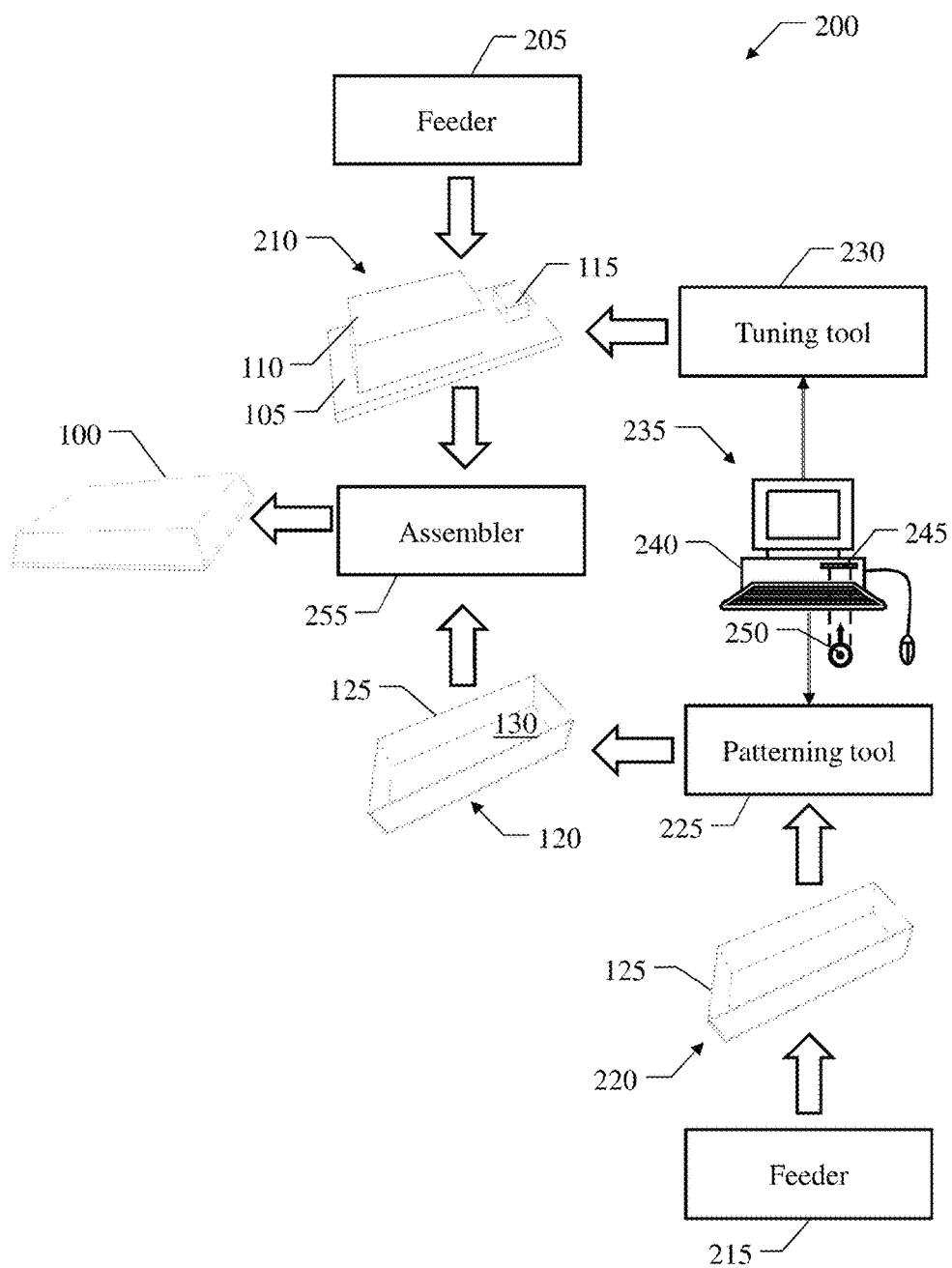
FIG. 2 shows a block diagram of a plant that may be used to manufacture electronic devices, according to one or more aspects of the present invention.

With reference to FIG. 2, a schematic block diagram is shown of one embodiment of a plant 200 that may be used to manufacture the electronic devices 100 according to an embodiment of the present disclosure.

The electronic devices 100 are manufactured in the plant 200 at the level of batches; each batch includes a high number of items of a same electronic device 100 (hereinafter, for the sake of simplicity referred to as electronic devices 100 as well).

By way of example, a feeder 205 feeds main modules 210 of the electronic devices 100 in succession. The main modules 210 include all the components of the electronic devices 100 without their caps 120 (i.e., the carrier 105 with the chip 110 and the battery 115 mounted thereon). The main modules 210 have a same functional structure, which is substantially identical for the electronic devices 100 of the batch; in other words, the main modules 210 are identical apart from possible minor differences that are substantially irrelevant for their operation (for example, their serial numbers). For example, the main modules 210 are provided by a foundry (not shown in the figure) wherein the chips 110 are manufactured (in corresponding wafers by using the same masks) and then the chips 110 and the batteries 115 are mounted onto the carriers 105 (for example, provided by external suppliers that manufacture them). A further feeder 215 feeds workpieces 220 for the caps 120 in succession. The workpieces 220 include the insulating substrates 125 without their security circuits; therefore, all the workpieces 220 of the batch are substantially identical. For example, the workpieces 220 are provided by an external supplier (not shown in the figure) that manufactures them.

A patterning tool 225 receives the workpieces 220 in succession from the feeder 215. The patterning tool 225 forms the security circuits 130 onto the insulating substrates 125 so as to obtain the corresponding caps 120. For example, the patterning tool 225 is based on the Laser Direct Structuring (LDS) technology (wherein a laser selectively activates the metal-plastic additive of the insulating substrates 125 for subsequent metallization). A tuning tool 230 receives the main modules 210 in succession from the feeder 205 (synchronized with the corresponding workpieces 220). The tuning tool 230 configures the monitoring circuits of the main modules 210 for monitoring the security circuits 130 of the corresponding caps 120.

The patterning tool 225 and the tuning tool 230 are controlled by a computing system, or simply computer, 235. The computer 235 (for example, a PC) includes a central unit 240, which houses the electronic circuits (not shown in the figure) controlling its operation. Particularly, these electronic circuits include a microprocessor, a working memory and drives for input/output units; typically, the electronic circuits are implemented by integrated components mounted on a motherboard and on daughter boards plugged thereon. The central unit 240 further houses a mass memory of the computer 235 (for example, implemented by a hard disk, not shown in the figure) and it is connected in a conventional manner to several input/output units (for example, a monitor, a keyboard and a mouse). Particularly, the computer 235 has a drive 245 for reading/writing removable storage units 250 (for example, optical disks like DVDs).

In one or more implementations, the security circuits 130 may have individual configurations (for example, defined by their patterns), which are substantially different among them for the corresponding electronic devices 100 of the batch (for example, defined in a pseudo-random way by the computer 235). One or more electric characteristics of each security circuit 130 (for example, its resistance) is determined (for example, by the computer 235 according to the configuration of the security circuit 130); the monitoring circuit of each main module 210 is then configured according to the electric characteristics of the corresponding security circuit 130.

As a result, the security circuits 130 are non-deterministic; therefore, any localized analysis of the security circuits is ineffective in predicting their whole scheme.

Moreover, even the availability of any number of samples of the electronic devices 100 for testing and practice (even for a long period) does not provide any useful information about the security circuits 130 of other electronic devices 100.

All of the above significantly reduces the risk of tampering of the electronic devices 100, with a corresponding increase of their security level.

An assembler 255 receives the caps 120 and the main modules 210 in succession from the patterning tool 225 and from the tuning tool 255, respectively; the caps 120 and the main modules 210 are synchronized, so as to associate each cap 120 with the main module 210 configured according to the electric characteristics of its security circuit 130. The assembler 255 assembles in succession each pair of cap 120 and main module 210 (for example, by wire bonding the chip 110 to the security circuit 130 and then soldering the cap 120 onto the main module 210) so as to obtain the corresponding electronic devices 100.

Figure 3:
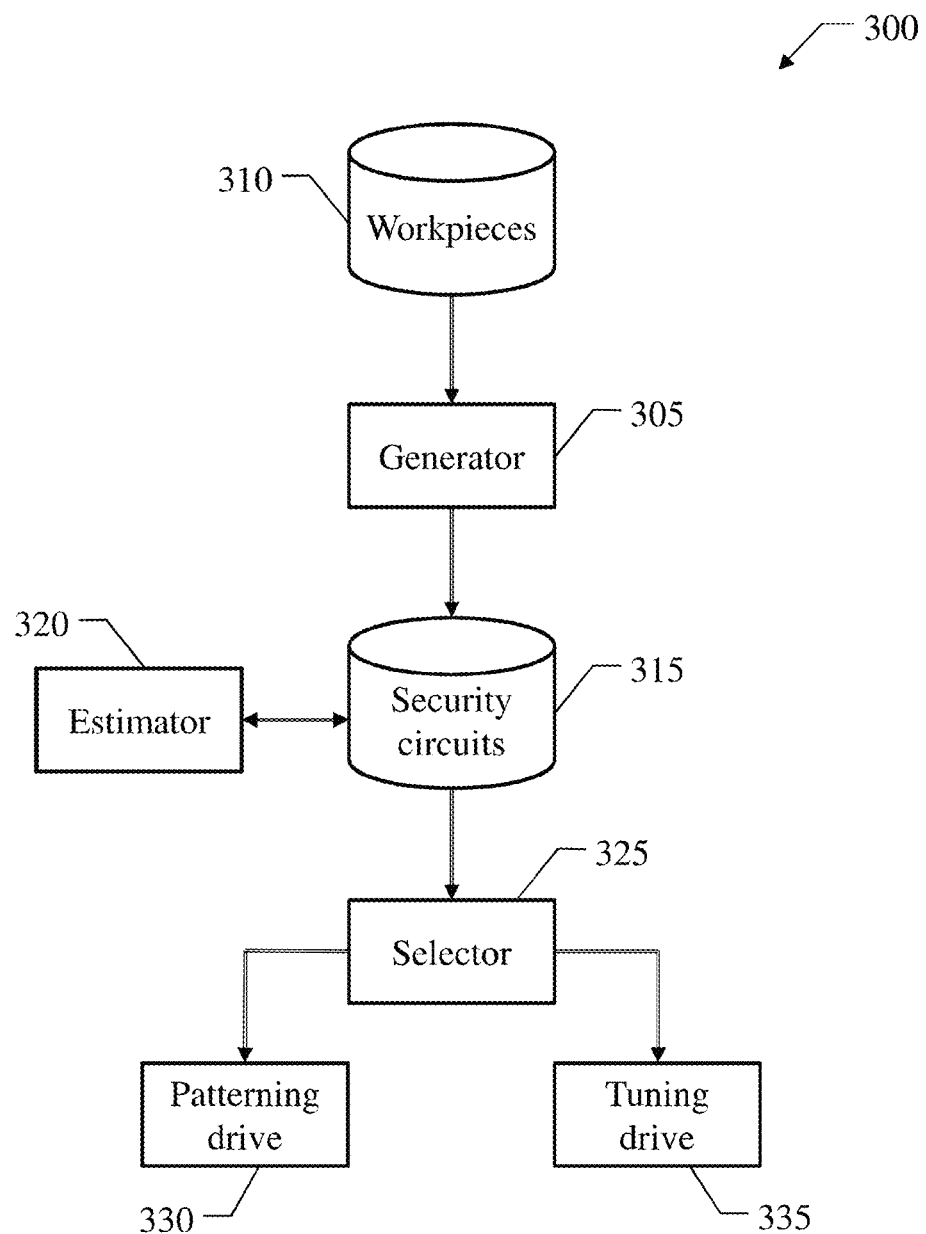
FIG. 3 depicts one embodiment of software components that may be used to implement one or more aspects of the present invention.

With reference to FIG. 3, one embodiment of the main software components are shown that may be used to implement one of more aspects the present invention.

By way of example, all the software components (programs and data) are denoted as a whole with the reference 300. The software components may be stored in mass memory and loaded (at least partially) into working memory of the computer (controlling the manufacturing of the electronic devices) when the programs are running, together with an operating system and other application programs (not shown in the figure). The programs are initially installed into the mass memory, for example, from removable storage units or from a network. In this respect, each program may be a module, segment or portion of code, which includes one or more executable instructions for implementing the specified logical function.

More specifically, a generator 305 may generate the electric circuits for each batch (i.e., their configurations) in a pseudo-random way. The generator 305 accesses (in read mode only) a workpiece repository 310 storing a definition of the workpieces of each batch (for example, their shape, size and functional area for the security circuit); moreover, the generator 305 controls (in write mode) a security circuit repository 315 storing a representation of a pool of (candidate) security circuits for each batch. An estimator 320 further controls (in read/write mode) the security circuit repository 315; the estimator 320 estimates the electric characteristics of each security circuit and adds an indication thereof to the corresponding representation in the security circuit repository 315. A selector 325 accesses (in read mode only) the security circuit repository 315; the selector 325 selects the security circuits stored therein in a pseudo-random way. The selector 325 passes the configuration of each selected security circuit to a patterning drive 330 controlling the patterning tool accordingly; at the same time, the selector 325 passes the electric characteristics of each selected security circuit to a tuning drive 335 controlling the tuning tool accordingly.

Figure 4A:
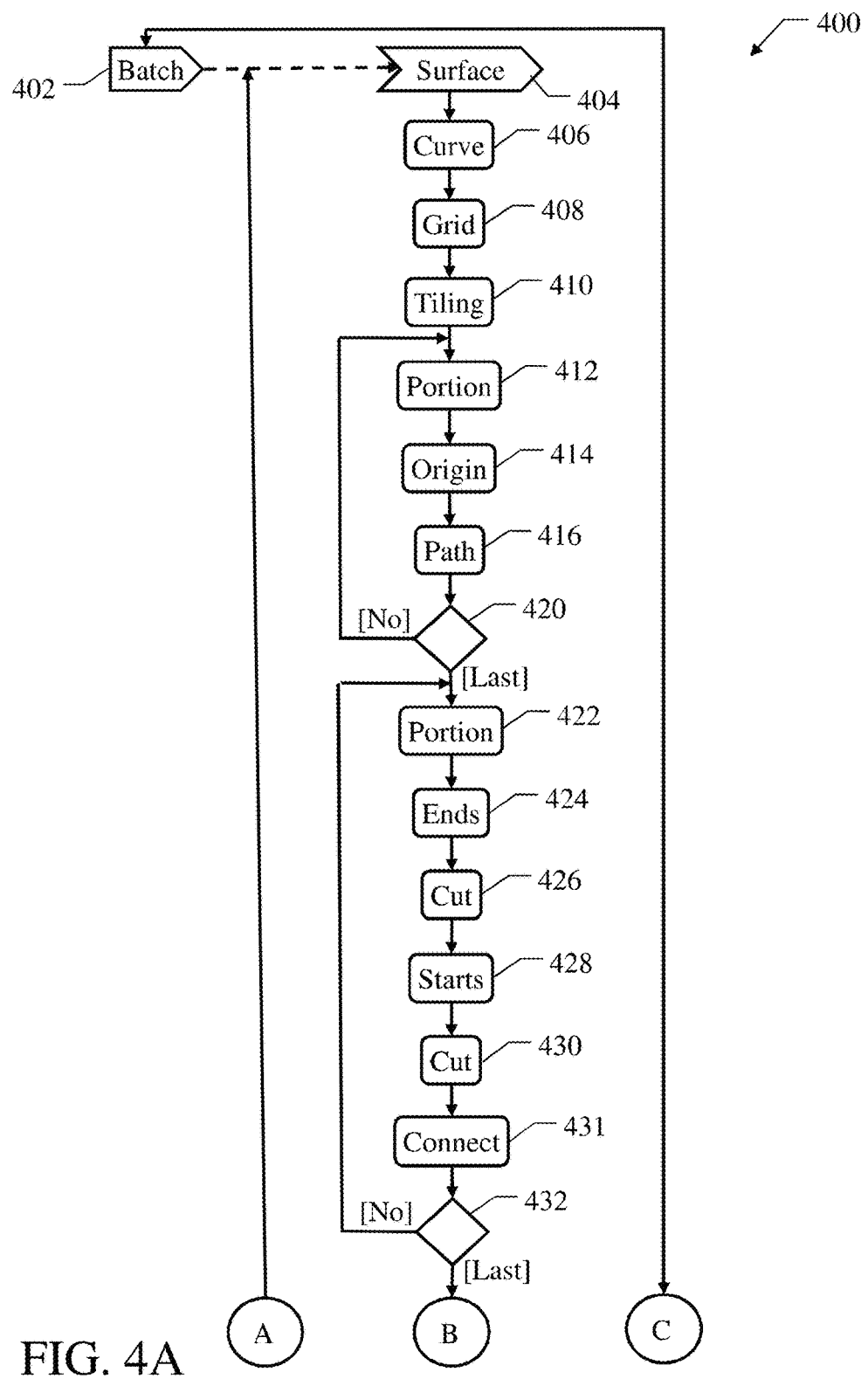
FIGS. 4A-4B depict one embodiment of a process for implementing one or more aspects of the present invention.
Figure 4B:
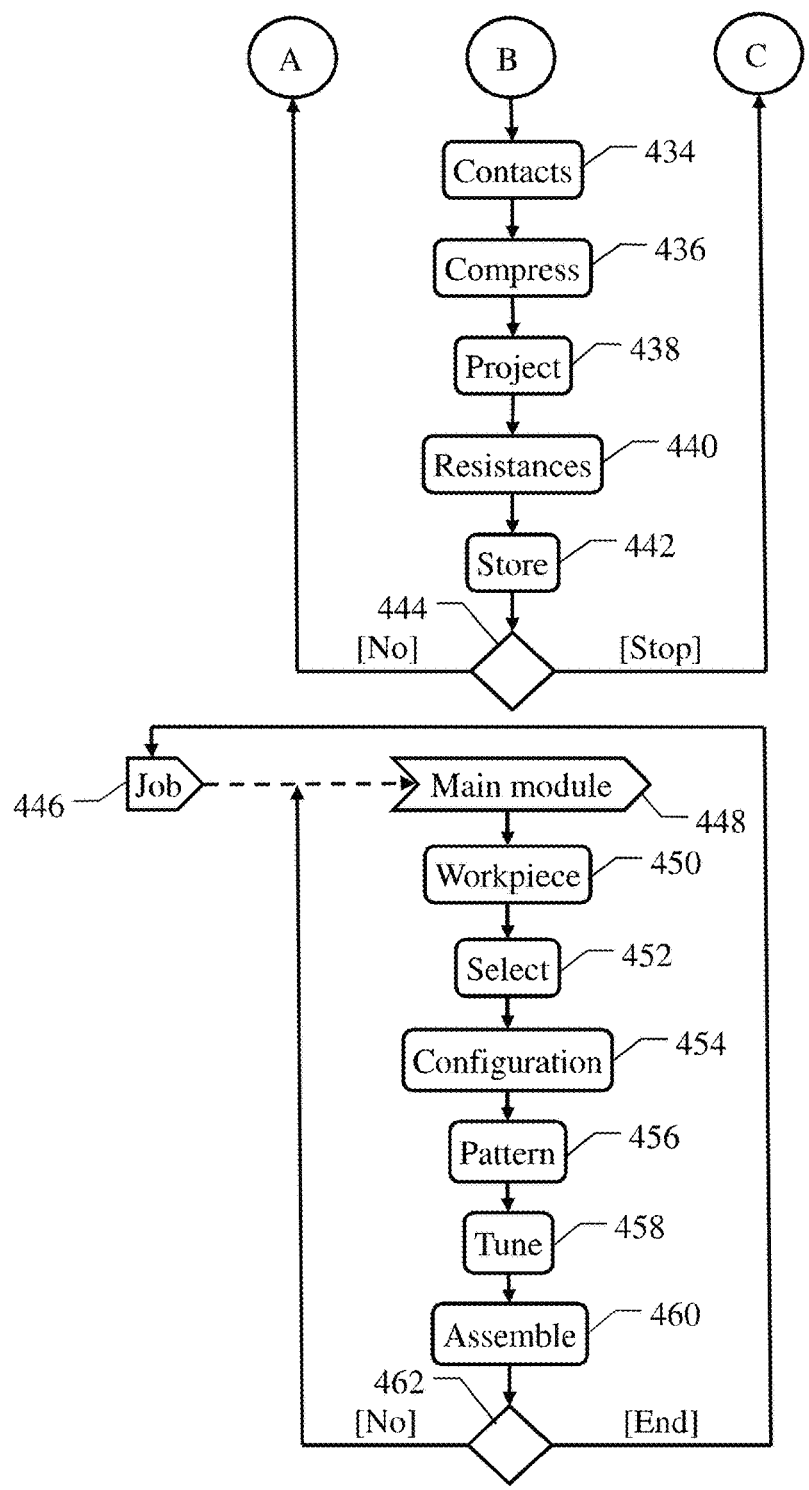

With reference to FIGS. 4A-4B, an activity diagram is shown of one embodiment of activities relating to an implementation of one or more aspects of the present invention.

Particularly, the diagram represents an exemplary process 400 that may be used to manufacture the electronic devices. In this respect, each block may correspond to one or more executable instructions for implementing the specified logical function on the computer controlling the manufacturing process.

Figure 5A:
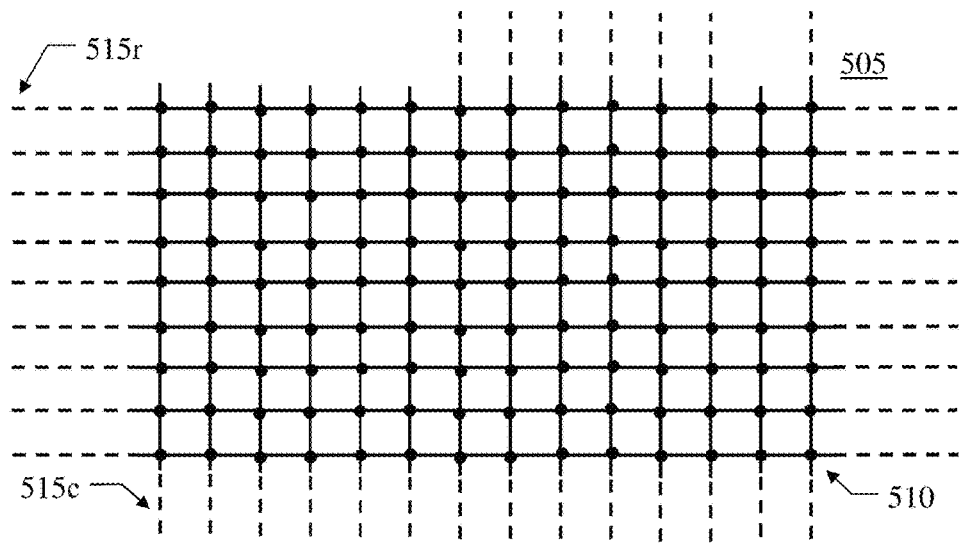
FIGS. 5A-5G show different implementation details of a process in accordance with one or more aspects of the present invention.

More specifically, the generator may be in a waiting condition at block 402. The process passes to block 404 as soon as the manufacturing of a new batch of electronic devices is planned; for example, this happens in response to a corresponding (manual) command accompanied by the (manual) loading of the definition of its workpieces into the workpiece repository (such as from a corresponding file provided by the supplier thereof). At this point, a loop is performed for generating the (candidate) security circuits for the batch. For this purpose, as shown in FIG. 5A, at first the generator extracts the definition of the functional area of the workpieces (wherein the security circuits are to be formed) from the workpiece repository, and it develops (i.e., flattens) the (3D) functional area into a (2D or planar) circuit surface 505. The generator then defines a circuit grid 510 in the circuit surface 505. For this purpose, the circuit surface 505 is covered by rows 515r and columns 515c, with a pitch corresponding to a spacing of the security circuit (for example, retrieved from a configuration parameter); the circuit grid 510 is defined by the points formed at the intersections of the rows 510r and the columns 510c (each one identified by coordinates formed by the corresponding row number and column number).

Figure 5B:
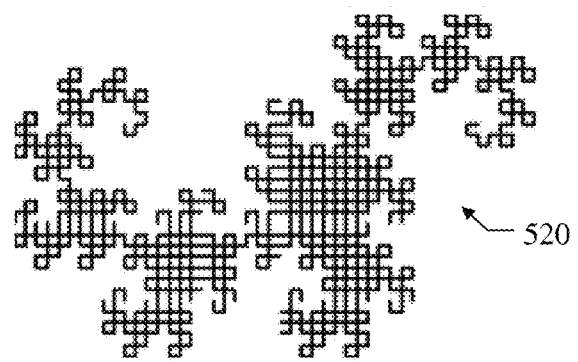
Figure 5C:
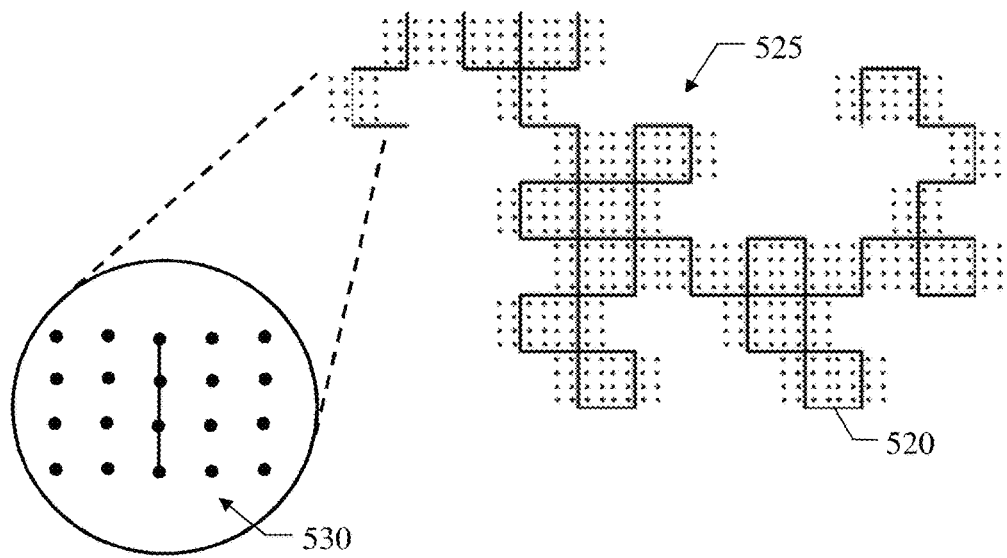
Figure 5D:
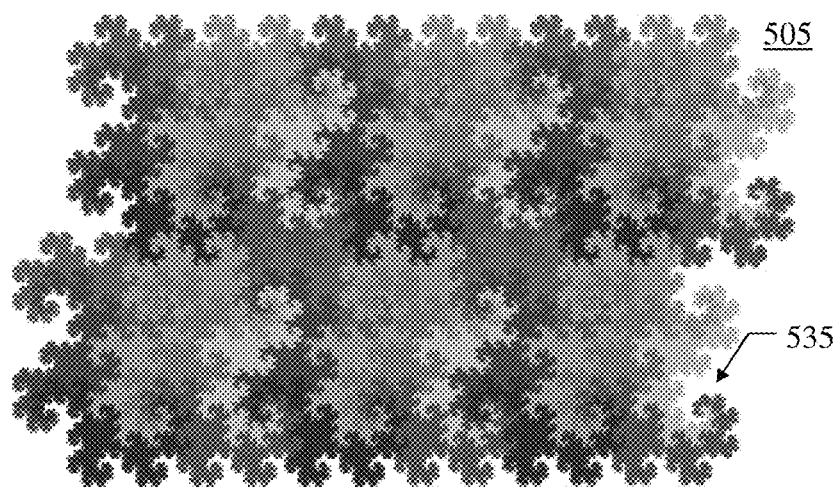

Returning to FIG. 4A, the process continues to block 406 for partitioning the circuit surface. For this purpose, as shown in FIG. 5B, the generator defines a partitioning curve 520. The partitioning curve 520 is an approximation of a space-filling curve. Briefly, a space-filling curve is a curve that passes through every point of a unit square. Most space filling curves are constructed iteratively as the limit of a sequence of (piecewise linear) intermediate curves; each intermediate curve then approximates the space filing curve (the higher the number of iterations the better the approximation). For example, the partitioning curve 520 is an approximation of a fractal curve, for example, a dragon curve (i.e., any member of a family of self-similar fractal curves that may be approximated by recursive methods, such as Lindenmayer systems); the partitioning curve 520 is created by stopping its construction after a pre-defined number of iterations (for example, 20-100 as defined in a configuration parameter). Returning to FIGS. 4A-4B, the process continues to block 408 for determining the points surrounding the partitioning curve. For this purpose, as shown in FIG. 5C, the generator defines a partitioning grid 525. The partitioning grid 525 is obtained by extending each segment of the partitioning curve 520 along a selected direction (for example, vertically) with an extension array 530; the extension array 530 is formed by a pre-defined number of points of the circuit surface 510 (for example, 1-3 as defined in a configuration parameter) that are arranged at both sides of the segment. Returning to FIGS. 4A-4B, the process continues to block 410 for tiling (or tasseling) the circuit surface according to the partitioning grid. For this purpose, as shown in FIG. 5D, the circuit surface 505 is partitioned into multiple portion surfaces 535 defined by replicating the partitioning grid (so as to cover it with no overlaps and no gaps). The portion surfaces 535 are ordered in a corresponding sequence; the sequence is defined according to any arbitrary order ensuring that consecutive portion surfaces 535 in the sequence are adjacent (for example, moving alternately rightwards, downwards and leftwards).

Returning to FIGS. 4A-4B, a loop is then performed for determining (local) paths in the portion surfaces. The loop begins at block 412, wherein the generator takes a (current) portion surface into account, starting from the first one. The generator at block 414 selects an origin point among all the points of the portion surface in a pseudo-random way. The generator at block 416 determines the corresponding local path so as to cross every point of the portion surface only once, starting from the origin point and returning to the origin point again in a closed loop (without intersecting with itself). For example, the local path is determined by applying the Travelling Salesman Problem (TSP) algorithm (aimed at minimizing the length of the trip of a salesman that has to visit a set of cities starting from one of them and returning to the same, wherein in this case the cities are represented by the points of the portion surface); particularly, the local path may be determined by a heuristic algorithm approximating its optimal solution (for example, the Markov chain algorithm seeded with a random path). The generator stores a representation of the local path into a corresponding working variable, for example, by defining the local path with a local list of the coordinates of the points of the portion surface along it, in any arbitrary direction starting from any arbitrary point thereof (for example, from the origin point). As a result, the local path as well is determined in a pseudo-random way. A test is then made at block 420, wherein the generator verifies whether all the portion surfaces have been processed. If not, the process returns to the block 412 to repeat the same operations on the next portion surface.

Figure 5E:
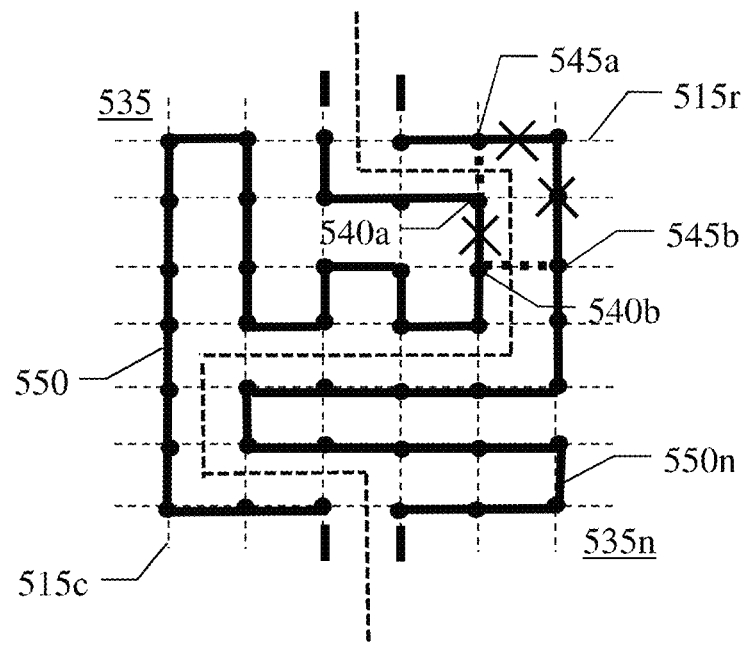

Conversely, once all the portion surfaces have been processed the loop is exited and another loop is performed for concatenating the local paths. This loop begins at block 422, wherein the generator again takes a (current) portion surface into account, starting from the first one. The generator at block 424 selects a pair of (first and second) end points of the portion surface in a pseudo-random way. As shown in FIG. 5E, the end points of the portion surface 535, denoted with the references 540a and 540b, are adjacent to each other along the corresponding local path, denoted with the reference 550; moreover, the end points 540a,540b are adjacent to the next portion surface (i.e., to one or more points thereof), differentiated with the reference 535n. Returning to FIGS. 4A-4B, the generator at block 426 cuts the shorter portion of the corresponding local path between the end points (as shown by a corresponding cross in FIG. 5E). The generator at block 428 selects a pair of (first and second) start points of the next portion surface in a pseudo-random way. As shown again in FIG. 5E, the start points of the next portion surface 535n, denoted with the references 545a and 545b, are adjacent to the end point 540a and to the end point 540b, respectively. Returning to FIGS. 4A-4B, the generator at block 430 cuts the shorter portion of the corresponding local path between the start points (as shown by corresponding crosses in FIG. 5E). The generator at block 431 connects the end points to the start points. Particularly, as shown again in FIG. 5E, the end point 540a is connected to the start point 545a and the end point 540b is connected to the start point 545b (as shown by corresponding dashed lines in the figure). As a result, the local path 550 of the portion surface 535 becomes concatenated (in a larger closed loop) with the local path of the portion surface 535n, differentiated with the reference 550n. The generator stores a representation of the concatenated local paths into a corresponding working variable, for example, by merging the corresponding local lists (i.e., inserting the local list of the next local path between the coordinates of the end points). Returning to FIGS. 4A-4B, a test is then made at block 432, wherein the generator verifies whether all the portion surfaces have been processed. If not, the process returns to the block 422 to repeat the same operations on the next portion surface.

Conversely, once all the portion surfaces have been processed, the loop is exited by descending into block 434. As a result, the local paths of all the portion surfaces are concatenated into a global path (as defined in the resulting local list, hereinafter referred to as global list), which crosses every point of the circuit surface only once in a closed loop; this makes the global path more random (since the randomness of all the local paths is combined into the global path with further randomness).

Figure 5F:
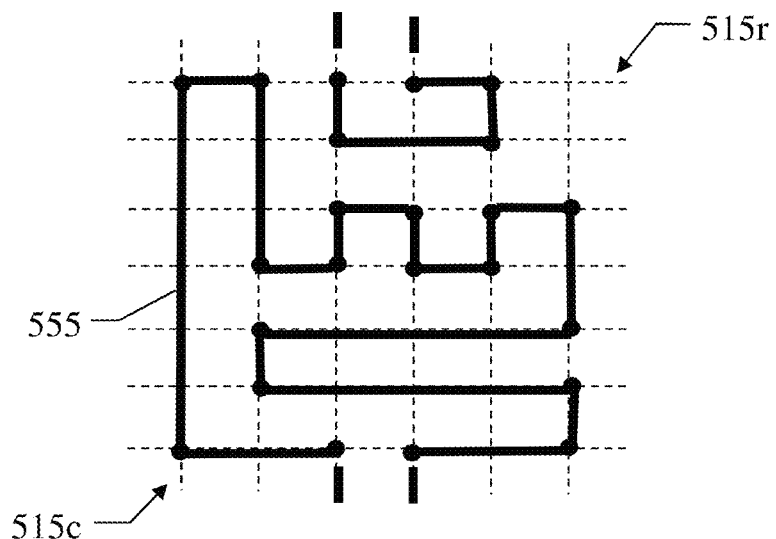
Figure 5G:
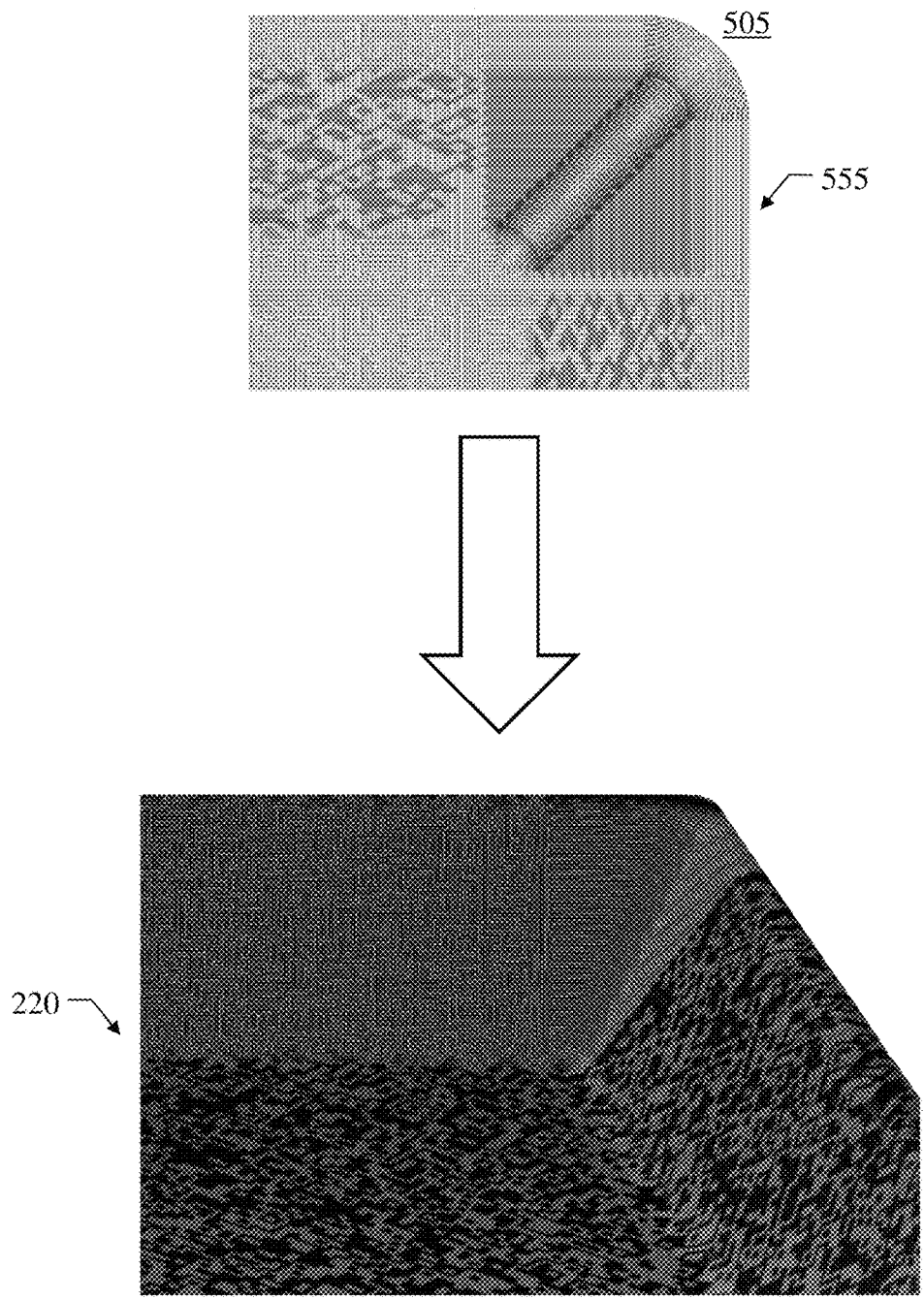

At this point, the generator selects a pair of (first and second) contact points of the global path (to be used for contacting the security circuit by the monitoring circuit) in a pseudo-random way (among all its points indicated in the global list). Continuing to block 436, the generator compresses the representation of the global path (in the global list). For this purpose, as shown in FIG. 5F, the generator eliminates each point of the global path, denoted with the reference 555, which is arranged between a pair of points thereof along the same row 515r or the same column 515c (by removing their coordinates from the global list); as a result, the representation of the global path reduces to the points corresponding to the vertexes only of its piecewise curve. This significantly reduces the size of the global list and then the memory space required to store it. Returning to FIGS. 4A-4B, the generator at block 438 projects the global path onto the workpieces. For this purpose, as shown in FIG. 5G, the representation of the global path 555 (in the global list) is projected from the (2D) circuit surface 505 onto the corresponding (3D) functional area of the workpieces 220. Returning to FIGS. 4A-4B, the generator at block 440 estimates the characteristics of the security circuit corresponding to the global path (to be monitored by the monitoring circuit). For example, the resistance of the two branches of the security circuit between its contact points may be calculated from a base resistance of a base line between each pair of adjacent points of the circuit surface, which base resistance is defined according to a width of the base line (for example, equal to a half of the pitch of the circuit grid), its height and a resistivity of the material of the security circuit (extracted from corresponding configuration parameters); the resistance of each branch is then calculated by summing the base resistance of each base line from a contact point to the other contact point along the branch (as indicated in the global list). The generator at block 442 adds a corresponding new record to the security circuit repository for storing the information so obtained (for the corresponding security circuit); particularly, the record includes the representation of the global path (as defined by its global list), the identification of its contact points (as defined by their coordinates) and the resistances of its branches.

A test is then made at block 444, wherein the generator verifies whether a total number of the security circuits for the batch has been reached; for example, the total number is set to a percentage (such as 30-50% as indicated in a configuration parameter) of the planned number of the electronic devices to be manufactured (entered manually). If not, the process returns to the block 404 to repeat the same operations for generating a further security circuit. Conversely, the process returns to the waiting condition at the block 402. All the above-described operations for populating the security circuit repository are performed off-line; therefore, even if they may be relatively time consuming, they do not have any impact on the yield of the manufacturing process of the electronic devices.

In an independent way, the selector is in a waiting condition at block 446. The process passes to block 448 as soon as a job for the manufacturing of a (previously planned) batch of electronic devices is submitted for execution (for example, by a scheduler). At this point, the corresponding feeder receives a (current) main module. Continuing to block 450, the corresponding feeder receives a (current) workpiece. The selector at block 452 selects one of the security circuits of the batch from the security circuit repository in a pseudo-random way; this operation is very fast, and it adds further randomness. The patterning drive at block 454 determines the actual configuration of the (selected) security circuit from the representation of its global path (extracted from the security circuit repository); particularly, the security circuit is defined by concatenating the base lines (used to estimate the resistances of its branches) along the corresponding points. The patterning drive at block 456 controls the patterning tool to form the security circuit inside the workpiece according to its definition (for example, converted into a CAD format, like DXF), so as to obtain the corresponding cap. At the same time, the tuning drive at block 458 controls the tuning tool to configure the monitoring circuit of the main module according to the resistances of the branches of the security circuit (extracted from the security circuit repository). Moreover, the above-described tiling based on the fractal curves makes it possible to exploit their self-similarity for creating repeatable electrical characteristics to be used for implementing more sophisticated security features that are fully or partially embedded in the security circuit; for example, it is possible to create voltage dividers (for example, of Kelvin or Kelvin-Varley type, generating an output voltage as an accurate ratio of an input voltage, with decades of resolution, making electromechanical precision DACs), voltage dividers with resistor ladders (for example, of the R-2R type, generating reasonable low cost DACs) or voltage dividers with string resistor ladders (for example, a string of many equally dimensioned resistors connected between two reference voltages, creating a resistor string ladder network paired to a comparator at each "rung" of the ladder, wherein comparing an input voltage to successive reference voltages defines a reasonable low cost "direct conversion" ADC). Continuing to block 460, the assembler receives the (configured) main module from the tuning tool and the cap from the patterning tool. The assembler connects the monitoring circuit of the main module to the contact points of the security circuit (as indicated in the security circuit repository); the assembler then assembles the cap with the main module, so as to obtain the corresponding electronic device. A test is then made at block 462, wherein the selector verifies whether the job has been completed. If not, the process returns to the block 448 to repeat the same operations for a next electronic device. Conversely, the process returns to the waiting condition at the block 446.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for manufacturing a batch including a plurality of items of an electronic device. However, the batch may include any number of items of any electronic device (for example, for use in Automated Teller Machines (ATMs), TV set-top boxes, military applications, high-security portable communication equipment).

In an embodiment, the items include a plurality of corresponding main modules having a same functional structure substantially identical for all the items. However, the main modules may be of any type (for example, with any number of chips mounted in any way, such as with flip-chip technology); the main modules may be identical completely or at least for their main functional aspects (for example, having the same part number, belonging to the same family).

In an embodiment, the method includes the following steps disclosed herein under the control of a computing system. However, the computing system may be of any type (see below) or its operations may be distributed (for example, to the patterning tool and/or the tuning tool).

In an embodiment, at least one security electric circuit (of an enclosure component for enclosing each item), adapted to protect the item from tampering, is defined. However, the enclosure (or package) component may be of any type (for example, formed by any number of elements of any type adapted to enclose, encapsulate or package, such as PCBs, chip carriers, thin-film circuits) and it may comprise any number of security electric circuits.

In an embodiment, the security electric circuits have individual configurations substantially different among the items. However, the configurations of the security electric circuits may be different for any number and type of aspects (for example, geometrical aspects like position, length, spacing and/or electrical aspects like height, width, material); moreover, the security electric circuits are different always or only statistically (i.e., the probability of finding two security electric circuits with the same configuration in the batch is not significant, for example, lower than 2-8%, preferably 3-7% and still more preferably 4-6%, such as 5%).

In an embodiment, the definition of the security electric circuit is for use in forming the security electric circuit with the corresponding configuration on each enclosure component. However, the security electric circuit may be formed in any way (see below), either immediately after its definition or later on.

In an embodiment, one or more electric characteristics of each security electric circuit are determined. However, the electric characteristics may be in any number and of any type (for example, capacitance, inductance), and they may be determined in any way (for example, with analytic or modelling techniques).

In an embodiment, the electric characteristics are for use in configuring a monitoring circuit of the corresponding main module (adapted to monitor the corresponding security electric circuit for detecting the tampering) according to the electric characteristics of the corresponding security electric circuit. However, the monitoring circuit may be configured in any way (see below), either immediately after the determination of its electric characteristics or later on; moreover, the electric characteristics may be monitored in any way (for example, with a Carey Foster bridge).

In an embodiment, the step of defining at least one security electric circuit includes defining the security electric circuit in a substantial random way. However, the security electric circuit may be defined in a truly random way, in a pseudo-random way or more generally in any other way ensuring its individuality (for example, according to the serial number of the corresponding electronic device).

In an embodiment, the step of defining at least one security electric circuit includes storing an indication of a pool of candidate security electric circuits for the batch. However, the candidate security electric circuits may be in any number and they may be stored in any way (for example, in dedicated databases for each batch). In any case, the security electric circuits may be determined off-line, in real-time or in any combination thereof (for example, by storing the local paths and combining them upon request, by storing the global path and projecting them upon request).

In an embodiment, the security electric circuit of each enclosure component is selected among the candidate security electric circuits in a substantial random way. However, this selection as well may be performed in any way (either the same or different from above).

In an embodiment, the step of defining at least one security electric circuit includes identifying a plurality of points spanning a portion surface corresponding to each of one or more portions of the enclosure component corresponding to the security electric circuit. However, the portions may be in any number (down to a single one) and they may be defined in any way (for example, by simply splitting the functional area of the enclosure component into squares); moreover, each portion surface may comprise any number of points arranged in any way (for example, with variable pitch).

In an embodiment, the step of defining at least one security electric circuit includes determining a path crossing at least part of the points of each portion surface. However, the path may be of any type (for example, closed and/or open, with horizontal, vertical and/or diagonal lines), even not crossing all the points of the portion surface (for example, at least a predetermined percentage thereof, such as 70-90%).

In an embodiment, the step of defining at least one security electric circuit includes defining the security electric circuit according to the corresponding paths. However, the security electric circuit may be defined in any way according to the paths (for example, with variable width).

In an embodiment, the step of determining a path includes selecting an origin point among the points of the portion surface and determining the path as crossing each point of the portion surface once starting from the origin point and returning to the origin point. However, the path may be determined in any other way (for example, by selecting a start point and an end point thereof), or more generally with any other algorithm (for example, to define an approximation of a Peano or Hilbert curve).

In an embodiment, the step of selecting an origin point includes selecting the origin point in a substantial random way. However, this selection as well may be performed in any way (either the same or different from above).

In an embodiment, the step of determining the path includes determining the path according to a Travelling Salesman Problem algorithm. However, the path may be determined according to any implementation of the TSP algorithm (for example, with either exact or heuristic algorithms).

In an embodiment, the step of defining at least one security electric circuit includes partitioning a circuit surface (corresponding to the security electric circuit) into a plurality of said portion surfaces ordered in a sequence (with each pair of consecutive ones of the portion surfaces in the sequence being adjacent). However, the partitioning of the circuit surface may be of any type (for example, periodic, regular, semiregular, aperiodic) or it may be omitted at all.

In an embodiment, the step of defining at least one security electric circuit includes concatenating the paths of the portion surfaces along the sequence. However, the paths may be concatenated in any way (for example, in two or more points).

In an embodiment, the step of concatenating the paths includes the following operations for each portion surface different from a last one of the portion surfaces along the sequence.

In an embodiment, these operations include selecting a first end point and a second end point of the portion surface adjacent to each other (the first end point and the second end point being adjacent to a next one of the portion surfaces along the sequence). However, the end points may be separated by any number of points (down to none) and they may be adjacent to any number of points of the next portion surface.

In an embodiment, these operations include cutting the path of the portion surface between the first end point and the second end point. However, the cut may involve the removal of any number of points (down to none).

In an embodiment, these operations include selecting a first start point and a second start point of the next portion surface (the first start point and the second start point being adjacent to the first end point and to the second end point, respectively). However, the end points and the start points may be separated by any number of points (down to none).

In an embodiment, these operations include cutting the path of the next portion surface between the first start point and the second start point. However, the cut may involve the removal of any number of points (down to none).

In an embodiment, these operations include connecting the first end point to the first start point and the second end point to the second start point. However, the end points may be connected to the start points in any way (for example, diagonally).

In an embodiment, the step of selecting a first end point and a second end point includes selecting the first end point and the second end point in a substantial random way. However, this selection as well may be performed in any way (either the same or different from above).

In an embodiment, the step of selecting a first start point and a second start point includes selecting the first start point and the second start point in a substantial random way. However, this selection as well may be performed in any way (either the same or different from above).

In an embodiment, the step of partitioning a circuit surface includes partitioning the circuit surface into the portion surfaces according to corresponding partitioning curves approximating a plane-filling curve. However, the partitioning curves may be of any type (for example, Peano, Hilbert, Sierpinsky curves).

In an embodiment, the step of partitioning a circuit surface includes defining each portion surface according to the points of the circuit surface surrounding the corresponding partitioning curve. However, each portion surface may be defined in any way according to the points surrounding the corresponding partitioning curve (for example, at both sides along its whole extent, either symmetrically or not).

In an embodiment, each partitioning curve includes a plurality of segments. However, the partitioning curve may comprise any number of segments or more generally it may be of any other type.

In an embodiment, the defining each portion surface includes defining each portion surface according to an extension array of the points of the circuit surface surrounding each segment of the corresponding partitioning curve extending along a selected direction. However, the extension array may comprise any number of points surrounding the segments along any direction (for example, horizontally).

In an embodiment, the step of defining at least one security electric circuit includes selecting a first contact point and a second contact point in the security electric circuit in a substantial random way. However, this selection as well may be performed in any way (either the same or different from above) or it may be omitted at all (for example, when the security electric circuit is open).

In an embodiment, the contact points are for use in contacting the security electric circuit by the monitoring circuit of the corresponding main module. However, the contact points may be contacted in any way (for example, via corresponding conductive tracks).

In an embodiment, the step of defining at least one security electric circuit includes compressing each corresponding path by eliminating each point of the path arranged between a pair of the points of the path along each direction. However, the compression may be performed in any way (for example, at the level of the local paths or at the level of the global path) or it may be omitted at all.

In an embodiment, the step of defining at least one security electric circuit includes developing a functional area of the enclosure component corresponding to the security electric circuit into a planar surface. However, the development may be performed in any way (for example, by unfolding the functional area).

In an embodiment, the step of defining at least one security electric circuit includes defining the security electric circuit for the planar surface. However, the possibility of defining the security electric circuit directly in 3D (without any development of the functional area) is not excluded.

In an embodiment, the step of defining at least one security electric circuit includes projecting the security electric circuit from the planar surface onto the functional area of the enclosure component. However, the projection may be performed in any way (according to the development).

In an embodiment, the method includes providing the main modules. However, the main modules may be provided in any way (for example, received from a different plant or from a supplier).

In an embodiment, the method includes providing a plurality of workpieces corresponding to the enclosure components. However, the workpieces may be of any type (for example, already with a conductive layer to be patterned) and they may be provided in any way (for example, manufactured internally).

In an embodiment, the method includes forming the security electric circuit with the corresponding configuration on each enclosure component. However, the security electric circuit may be formed in any way (for example, with etching or deposition techniques).

In an embodiment, the method includes configuring the monitoring circuit of each main module according to the electric characteristics of the corresponding security electric circuit. However, the monitoring circuit may be configured in any way (for example, before or after assembling it with the corresponding enclosure component).

In an embodiment, the method includes assembling each main module and the corresponding enclosure component. However, the main module and the enclosure component may be assembled in any way (for example, by gluing them).

An embodiment provides a computer program configured for causing a computing system to perform the above-mentioned method when the computer program is executed on the computing system. An embodiment provides a computer program product, the computer program product including a computer readable storage medium having program instructions embodied therewith, the program instructions executable by a computing system to cause the computing system to perform the same method. However, the software program may be implemented as a stand-alone module, as a plug-in for a pre-existing software program (for example, in a control program of the patterning and/or tuning tool), or even directly in the latter; moreover, it is also possible to deploy the same solution as a service that is accessed through a network (such as in the Internet).

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing.

A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Computer readable program instructions described herein can be downloaded to respective computing/processing devices from a computer readable storage medium or to an external computer or external storage device via a network, for example, the Internet, a local area network, a wide area network and/or a wireless network.

The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment provides a system including means configured for performing the steps of the above-mentioned method. An embodiment provides a system including a circuitry (i.e., any hardware suitably configured, for example, by software) for performing each step of the same method. However, the system may be of any type (for example, of physical or virtual type, with a stand-alone or a distributed architecture).

An embodiment provides a batch including a plurality of items of an electronic device. In an embodiment, the items comprise a plurality of corresponding main modules having a same functional structure substantially identical for all the items. In an embodiment, the items comprise a plurality of corresponding enclosure components for enclosing the items each one including at least one security electric circuit adapted to protect the corresponding item from tampering, the security electric circuits having individual configurations substantially different among the items. In an embodiment, each main module includes a monitoring circuit, adapted to monitor the corresponding security electric circuit for detecting the tampering, being configured according to one or more electric characteristics of the corresponding security electric circuit. However, the batch may be of any type (see above).

Generally, similar considerations apply if the system and the items of the batch each has a different structure or includes equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

Also, note that any of the above-described features may be combined in any way.

What is claimed is:

1. A method for manufacturing a batch of a plurality of items of an electronic device, each item including an enclosure mounted to an upper surface of a respective carrier, the items comprising a plurality of corresponding main modules having a same functional structure substantially identical for the items, wherein the method comprises:

defining, for each of a plurality of enclosures, at least one security electric circuit on an inner surface of the enclosure, the enclosure component to mount to the upper surface of the respective carrier and enclose, at least in part, a respective main module on the upper surface of the respective carrier, the at least one security electric circuit being adapted to protect the respective item from tampering, and the security electric circuits defined for the plurality of enclosures having individual configurations substantially different among the plurality of enclosures for the items;

determining one or more electric characteristics of each security electric circuit and using the determined one or more electric characteristics of each security electric circuit in configuring a monitoring circuit of the corresponding main module of the respective item, the monitoring circuit being adapted to monitor the corresponding security electric circuit for detecting the tampering, according to the determined electric characteristics of the corresponding at least one security electric circuit; and wherein the defining at least one security electric circuit comprises:
storing an indication of a pool of candidate security electric circuits for the batch;
selecting the security electric circuit of each enclosure among the pool of candidate security electric circuits in a substantially random way;
developing for each enclosure a functional area of the enclosure corresponding to the security electric circuit into a planar surface;
defining the security electric circuit for the planar surface; and
projecting the security electric circuit from the planar surface onto the functional area of the enclosure to facilitate forming the security electric circuit directly on the inner surface of the enclosure.

2. The method according to claim 1, wherein the defining at least one security electric circuit comprises:
defining the security electric circuit in a substantially random way.

3. The method according to claim 1, wherein the defining at least one security electric circuit comprises:
identifying a plurality of points spanning a portion surface corresponding to each of one or more portions of the enclosure corresponding to the security electric circuit;
determining a path crossing at least part of the plurality of points of each portion surface; and
defining the security electric circuit according to the corresponding paths.

4. The method according to claim 3, wherein the determining a path comprises:
selecting an origin point among the plurality of points of the portion surface; and
determining the path as crossing each point of the portion surface once starting from the origin point and returning to the origin point.

5. The method according to claim 4, wherein the selecting an origin point comprises:
selecting the origin point in a substantially random way.

6. The method according to claim 4, wherein the determining the path comprises:
determining the path according to a Travelling Salesman Problem algorithm.

7. The method according to claim 3, wherein the defining at least one security electric circuit comprises:
partitioning a circuit surface corresponding to the security electric circuit into a plurality of the portion surfaces ordered in a sequence with each pair of consecutive ones of the portion surfaces in the sequence being adjacent; and
concatenating the paths of the portion surfaces along the sequence.

8. The method according to claim 7, wherein the concatenating the paths comprises, for each portion surface different from a last one of the portion surfaces along the sequence:
selecting a first end point and a second end point of the portion surface adjacent to each other, the first end point and the second end point being adjacent to a next one of the portion surfaces along the sequence;
cutting the path of the portion surface between the first end point and the second end point;
selecting a first start point and a second start point of the next portion surface, the first start point and the second start point being adjacent to the first end point and to the second end point, respectively;
cutting the path of the next portion surface between the first start point and the second start point; and
connecting the first end point to the first start point and the second end point to the second start point.

9. The method according to claim 8, wherein at least one of:
the selecting a first end point and a second end point comprises selecting the first end point and the second end point in a substantially random way; or
the selecting a first start point and a second start point comprises selecting the first start point and the second start point in a substantially random way.

10. The method according to claim 7, wherein the partitioning a circuit surface comprises:
partitioning the circuit surface into the portion surfaces according to corresponding partitioning curves approximating a plane-filling curve.

11. The method according to claim 10, wherein the partitioning a circuit surface comprises:
defining each portion surface according to the points of the circuit surface surrounding the corresponding partitioning curve.

12. The method according to claim 11, wherein each partitioning curve comprises a plurality of segments, the defining each portion surface comprising:
defining each portion surface according to an extension array of the points of the circuit surface surrounding each segment of the corresponding partitioning curve extending along a selected direction.

13. The method according to claim 3, wherein the defining at least one security electric circuit comprises:
selecting a first contact point and a second contact point in the security electric circuit in a substantially random way for use in contacting the security electric circuit by the monitoring circuit of the corresponding main module.

14. The method according to claim 3, wherein the defining at least one security electric circuit comprises:
compressing each corresponding path by eliminating each point of the path arranged between a pair of the points of the path along each direction.

15. The method according to claim 1, comprising:
providing the main modules;
providing the plurality of enclosures;
forming on the inner wall surface of each enclosure the respective at least one security electric circuit with the corresponding configuration;
configuring the monitoring circuit of each main module according to the electric characteristics of the corresponding at least one security electric circuit; and
assembling each main module and the corresponding enclosure component by mounting the enclosure to the upper surface of the respective carrier on which the main module resides.

16. A computer program product, the computer program product comprising:
a computer readable storage medium having program instructions embodied therewith, the program instructions executable by a computing system to cause the computing system to perform a method for manufacturing a batch of a plurality of items of an electronic device, each item including an enclosure mounted to an upper surface of a respective carrier, the items comprising a plurality of corresponding main modules having a same functional structure substantially identical for the items, wherein the method comprises:
- defining, for each of a plurality of enclosures, at least one security electric circuit to be formed on an inner surface of the enclosure, the enclosure to mount to the upper surface of the respective carrier and enclose, at least in part, a respective main module on the upper surface of the respective carrier, the at least one security electric circuit being adapted to protect the respective item from tampering, and the security electric circuits defined for the plurality of enclosures having individual configurations substantially different among the plurality of enclosures enclosing components for the items;
- determining one or more electric characteristics of each security electric circuit and using the determined one or more electric characteristics of each security electric circuit in configuring a monitoring circuit of the corresponding main module of the respective item, the monitoring circuit being adapted to monitor the corresponding security electric circuit for detecting the tampering, according to the determined electric characteristics of the corresponding at least one security electric circuit; and
- wherein the defining at least one security electric circuit comprises:
  - storing an indication of a pool of candidate security electric circuits for the batch;
  - selecting the security electric circuit of each enclosure among the pool of candidate security electric circuits in a substantially random way;
  - developing for each enclosure a functional area of the enclosure corresponding to the security electric circuit into a planar surface;
  - defining the security electric circuit for the planar surface; and
  - projecting the security electric circuit from the planar surface onto the functional area of the enclosure to facilitate forming the security electric circuit directly on the inner surface of the enclosure.

17. A system for manufacturing a batch of a plurality of items of an electronic device, each item including an enclosure mounted to an upper surface of a respective carrier, the items comprising a plurality of corresponding main modules having a same functional structure substantially identical for all the items, wherein the system comprises:
- a memory; and
- a processor communicatively coupled to the memory, wherein the system performs a method comprising:
  - defining, for each of a plurality of enclosures, at least one security electric circuit to be formed on an inner surface of the enclosure, the enclosure to mount to the upper surface of the respective carrier and enclose, at least in part, a respective main module on the upper surface of the respective carrier, the at least one security electric circuit being adapted to protect the respective item from tampering, and the security electric circuits defined for the plurality of enclosures having individual configurations substantially different among the plurality of enclosures for the items;
  - determining one or more electric characteristics of each security electric circuit and using the determined one or more electric characteristics of each security electric circuit in configuring a monitoring circuit of the corresponding main module of the respective item, the monitoring circuit being adapted to monitor the corresponding security electric circuit for detecting the tampering, according to the determined electric characteristics of the corresponding at least one security electric circuit; and
  - wherein the defining at least one security electric circuit comprises:
    - storing an indication of a pool of candidate security electric circuits for the batch;
    - selecting the security electric circuit of each enclosure among the pool of candidate security electric circuits in a substantially random way;
    - developing for each enclosure a functional area of the enclosure corresponding to the security electric circuit into a planar surface;
    - defining the security electric circuit for the planar surface; and
    - projecting the security electric circuit from the planar surface onto the functional area of the enclosure to facilitate forming the security electric circuit directly on the inner surface of the enclosure component.

18. The system of claim 17, wherein the defining at least one security electric circuit comprises:
defining the security electric circuit in a substantially random way.

19. The system of claim 17, wherein the defining at least one security electric circuit comprises:
- identifying a plurality of points spanning a portion surface corresponding to each of one or more portions of the enclosure corresponding to the security electric circuit;
- determining a path crossing at least part of the plurality of points of each portion surface; and
- defining the security electric circuit according to the corresponding paths.

20. The system of claim 19, wherein the determining a path comprises:
- selecting an origin point among the plurality of points of the portion surface; and
- determining the path as crossing each point of the portion surface once starting from the origin point and returning to the origin point.

* * * * *